(12) United States Patent
Farber (10) Patent No.: US 9,079,541 B2
(45) Date of Patent: Jul. 14, 2015

(54) WATERCRAFT CARRIER

(75) Inventor: Robert Farber, Montreal (CA)

(73) Assignee: SWISS CARGO INDUSTRIES S.A. INC, St. Jean, Quebec (CA)

( * ) Notice: Subject to any disclaimer, the term of this patent is extended or adjusted under 35 U.S.C. 154(b) by 217 days.

(21) Appl. No.: 12/985,828

(22) Filed: Jan. 6, 2011

(65) Prior Publication Data

US 2011/0163142 A1      Jul. 7, 2011

Related U.S. Application Data

(60) Provisional application No. 61/293,126, filed on Jan. 7, 2010.

(51) Int. Cl.
    *B60R 9/08*      (2006.01)
    *B60R 9/045*     (2006.01)
    *B60R 9/048*     (2006.01)

(52) U.S. Cl.
    CPC . *B60R 9/08* (2013.01); *B60R 9/045* (2013.01); *B60R 9/048* (2013.01)

(58) Field of Classification Search
    CPC .......... B60R 9/04; B60R 9/045; B60R 9/048; B60R 9/08
    USPC ................ 224/319, 321, 530, 531, 322, 325; 211/85.7, 100, 171, 169.1; 410/49, 410/153, 50
    See application file for complete search history.

(56) References Cited

U.S. PATENT DOCUMENTS

| | | | |
|---|---|---|---|
| 5,076,479 A * | 12/1991 | Davison | 224/324 |
| 5,118,020 A * | 6/1992 | Piretti | 224/493 |
| 5,377,885 A * | 1/1995 | Wyers | 224/493 |
| D497,873 S | 11/2004 | Graber | |
| D499,372 S | 12/2004 | Andersson | |
| D571,279 S | 6/2008 | Trusty et al. | |
| D598,689 S | 8/2009 | McDonald | |
| D605,577 S | 12/2009 | Maguire | |
| D605,578 S | 12/2009 | Retief | |
| D623,120 S | 9/2010 | Farber | |
| D637,949 S * | 5/2011 | Farber | D12/412 |
| 2006/0273122 A1* | 12/2006 | Bogoslofski et al. | 224/324 |
| 2009/0120982 A1* | 5/2009 | Sautter et al. | 224/323 |

* cited by examiner

*Primary Examiner* — Brian D Nash
*Assistant Examiner* — Corey Skurdal
(74) *Attorney, Agent, or Firm* — Husch Blackwell, LLP (57) ABSTRACT

A watercraft carrier having a cradle shaped base member and a center support bracket pivotally connected to the base member in a releasably locking manner by at least two lockable pivotal positioning assemblies. The lockable pivotal positioning assemblies featuring interlocking hubs having interlocking gear teeth and gear groves. The lockable pivotal positioning assemblies enabling the center support bracket to be locked at any number of angular positions relative the base member.

16 Claims, 8 Drawing Sheets

WATERCRAFT CARRIER

CROSS REFERENCE TO RELATED APPLICATION

This application claims the benefit of U.S. Provisional Application Ser. No. 61/293,126 filed Jan. 7, 2010 entitled "Watercraft Carrier" The entirety of this application is incorporated by reference as if fully set forth herein.

FIELD OF THE INVENTION

The present disclosure is directed generally to a vehicular mounted watercraft carrier. The carrier can adjust to accommodate different sized water crafts and can also adjusted to accommodate two smaller crafts such, for example, as two kayaks.

BACKGROUND OF THE INVENTION

Often times, persons owning or desiring to use small personal watercraft, such as kayaks and canoes, will need to transport the watercraft via an automobile or other type of vehicle. Generally, the interiors of some vehicles do not have sufficient size to accommodate such watercraft. Accordingly, there have been many efforts directed towards providing a mounting rack on the exterior of the vehicle which can accommodate such watercraft. Ordinary cartop carriers have been used in some instances, but such devices can be heavy and awkward to install, and cannot be, or are not easily, adjustable so as to accommodate watercraft of different sizes. Additionally, many such carriers are only capable of accommodating a single kayak or canoe and cannot be reconfigured to transport multiple watercraft at the same time.

Accordingly, there is a need in the art for a watercraft carrier that can be mounted to a vehicle and is capable of being easily adjusted to accommodate small personal watercraft of different sizes or multiple watercraft simultaneously. There is an additional need that such a carrier have a configuration that allows for the watercraft to be affixed in an efficient manner and without undue effort, and that is of a lightweight yet durable design so as to enable a user to easily affix and detach the carrier to a vehicle, but also be able to withstand harsh treatment associated outdoor use.

SUMMARY OF THE INVENTION

Embodiments of the present invention are directed to a watercraft carrier having a cradle shaped base member and a center support bracket pivotally connected to the base member in a releasably locking manner by pivotal positioning assemblies. The pivotal positioning assemblies featuring interlocking hubs having interlocking gear teeth and gear groves. The lockable pivotal positioning assemblies enabling the center support bracket to be locked at any number of angular positions relative the base member.

The watercraft carrier described and claimed herein can be mounted to a vehicle and can be easily adjusted to accommodate watercraft of different sizes or multiple watercraft simultaneously. In addition, the carrier enables watercraft to be affixed in an efficient manner and without undue effort. Further, the carrier is of a lightweight and durable design so as to enable a user to easily affix and detach the carrier to the vehicle and to withstand harsh treatment associated outdoor use. Further objects, features and advantages of the present invention will be apparent from the following description and the appended claims when taken in conjunction with the accompanying drawings.

BRIEF DESCRIPTION OF THE DRAWINGS

In the following detailed description, reference will frequently be made to the following views of the drawing, in which like reference numerals refer to like components, and in which.

DETAILED DESCRIPTION

While the present invention is susceptible of embodiment in various forms, there is shown in the drawings a number of presently preferred embodiments that are discussed in greater detail hereafter. It should be understood that the present disclosure is to be considered as an exemplification, and is not intended to limit the subject invention to the specific embodiments illustrated. Additionally, specific details disclosed herein are not to be interpreted as limiting, but merely as a representative basis for teaching one skilled in the art to variously employ the inventive features herein disclosed in virtually any appropriate manner and combination.

In this disclosure, the use of the disjunctive is intended to include the conjunctive. The use of the definite article or indefinite article is not intended to indicate cardinality. In particular, a reference to "the" object or "a" object is intended to denote also one of a possible plurality of such objects. It should be further understood that the title of this section of this application ("Detailed Description") relates to a requirement of the United States Patent Office, and should not be found to limit the subject matter disclosed herein.

Figure 1:
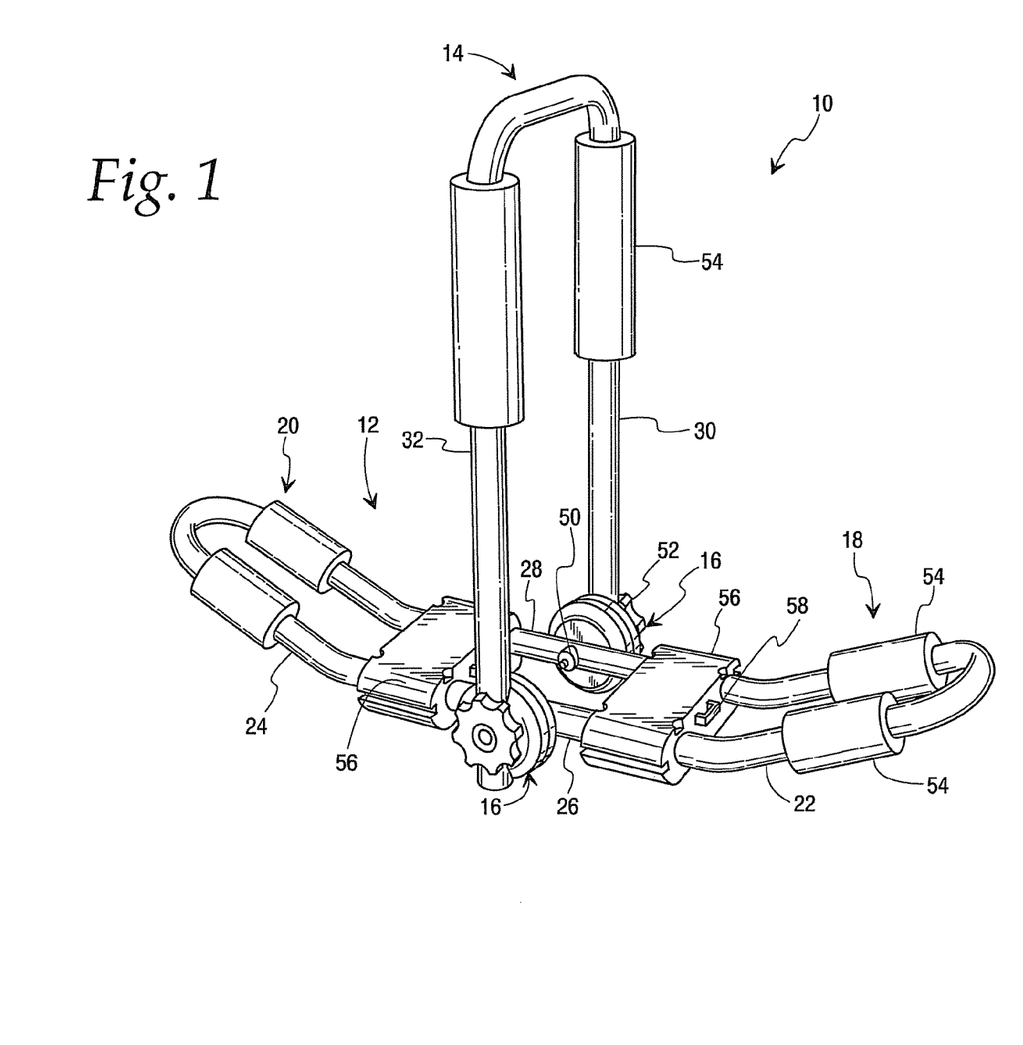
FIG. 1 is a perspective view of one embodiment of the watercraft carrier according to the present disclosure.
Figures 2, 3:
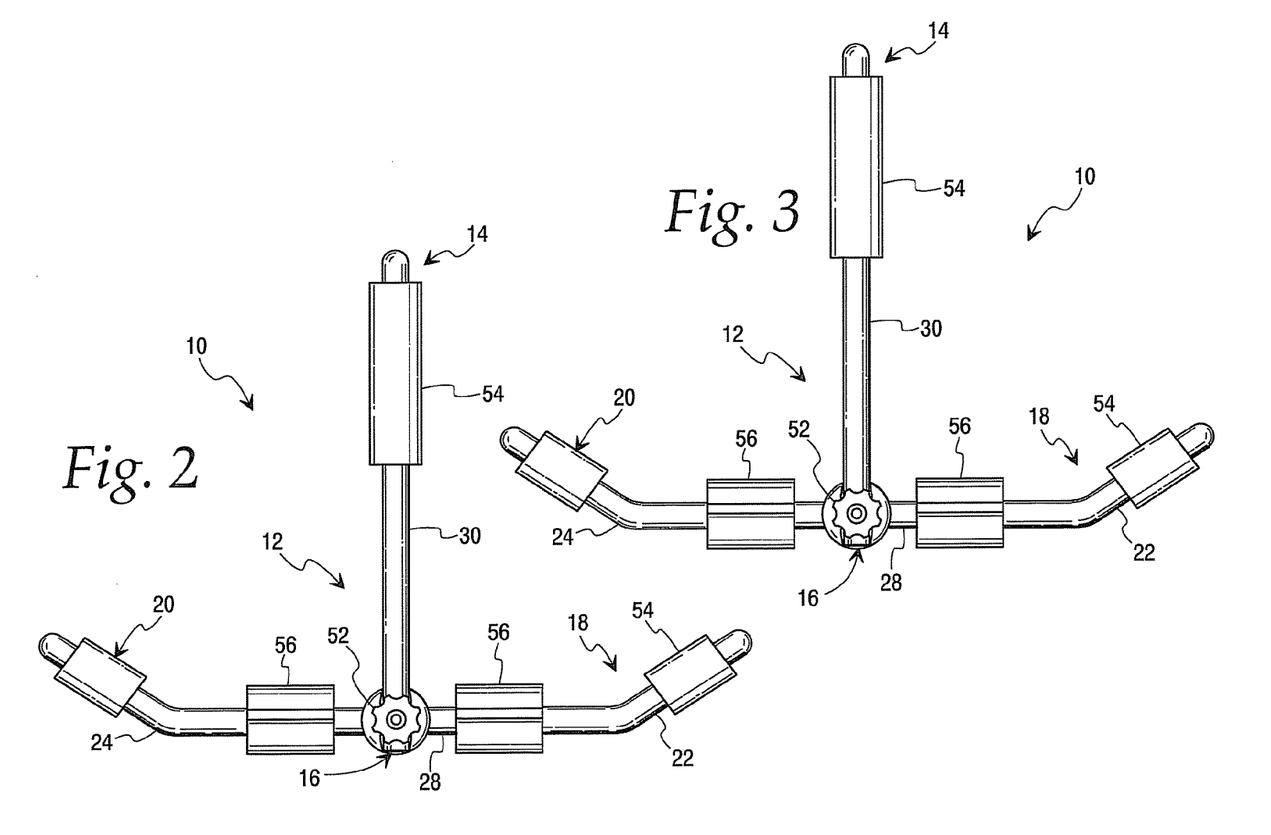
FIG. 2 is an elevational view of one side of the watercraft carrier shown in FIG. 1.
FIG. 3 is an elevational view the opposite side of the watercraft carrier shown in FIG. 1.
Figure 4:
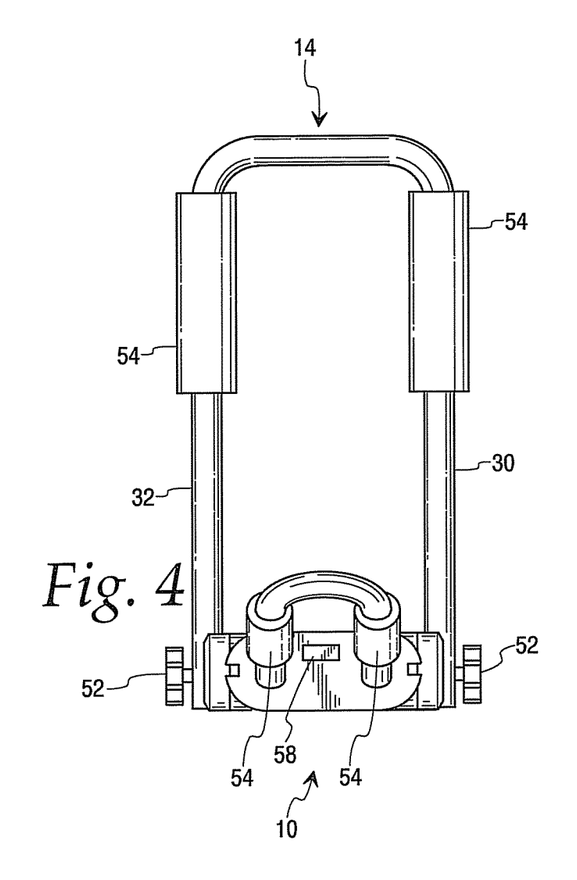
FIG. 4 is a front elevational view of the watercraft carrier shown in FIG. 1.
Figure 5:
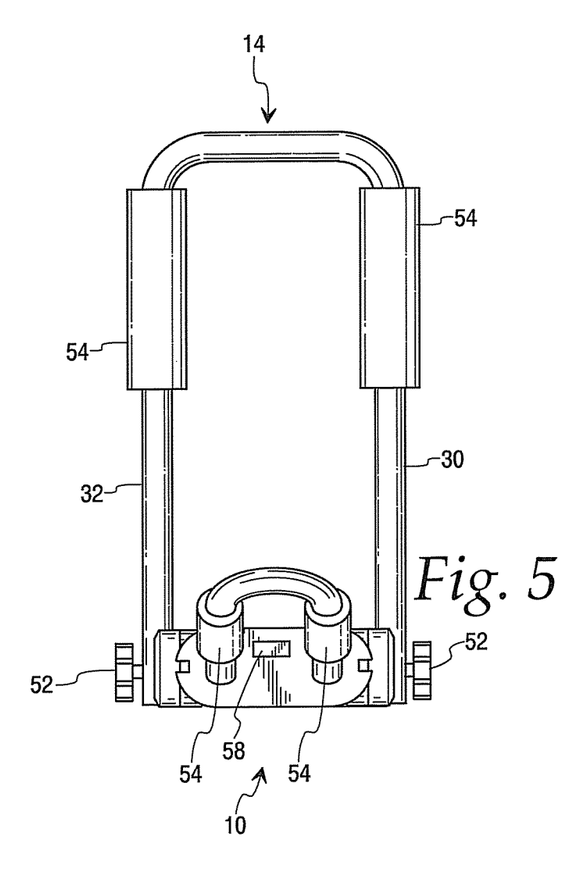
FIG. 5 is a is a rear elevational view of the watercraft carrier shown in FIG. 1.
Figure 6:
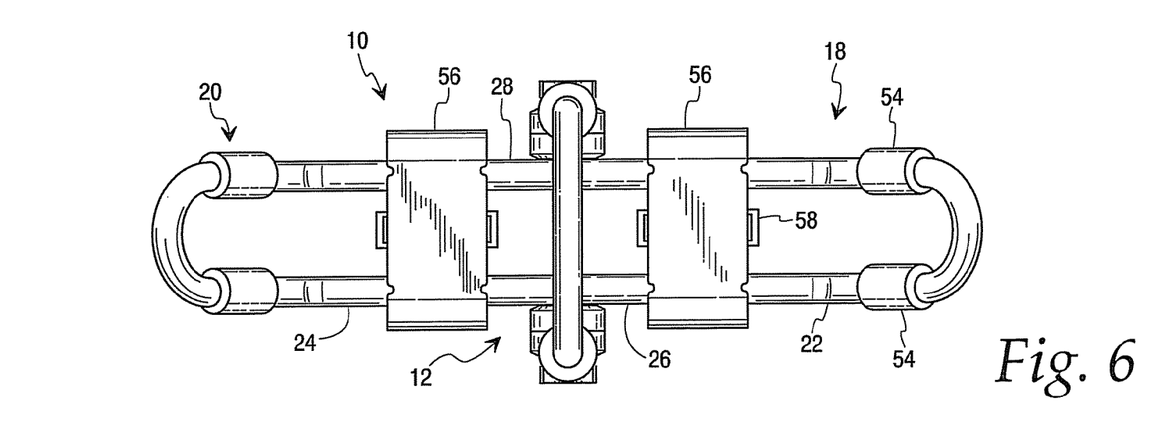
FIG. 6 is a top plan view of the watercraft carrier shown in FIG. 1.
Figure 7:
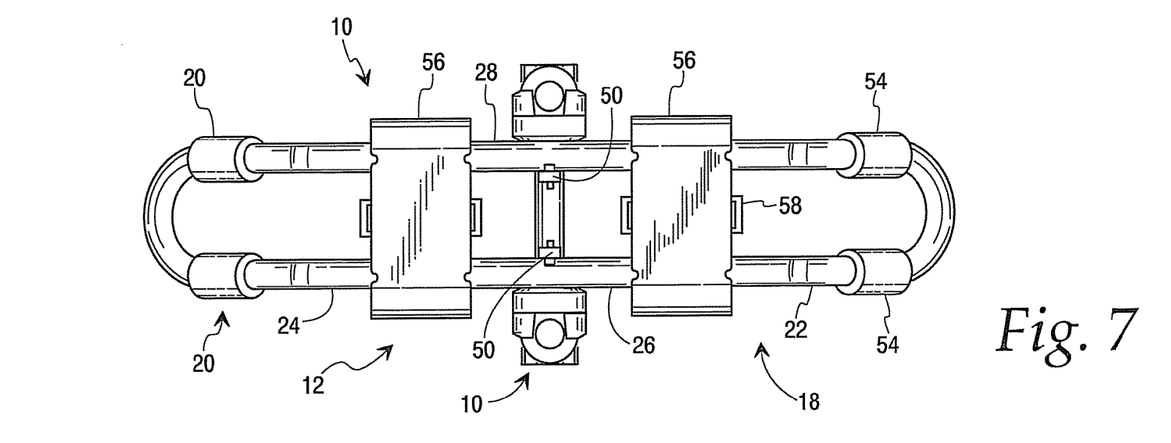
FIG. 7 is a bottom plan view of the watercraft carrier shown in FIG. 1.
Figures 8, 9:
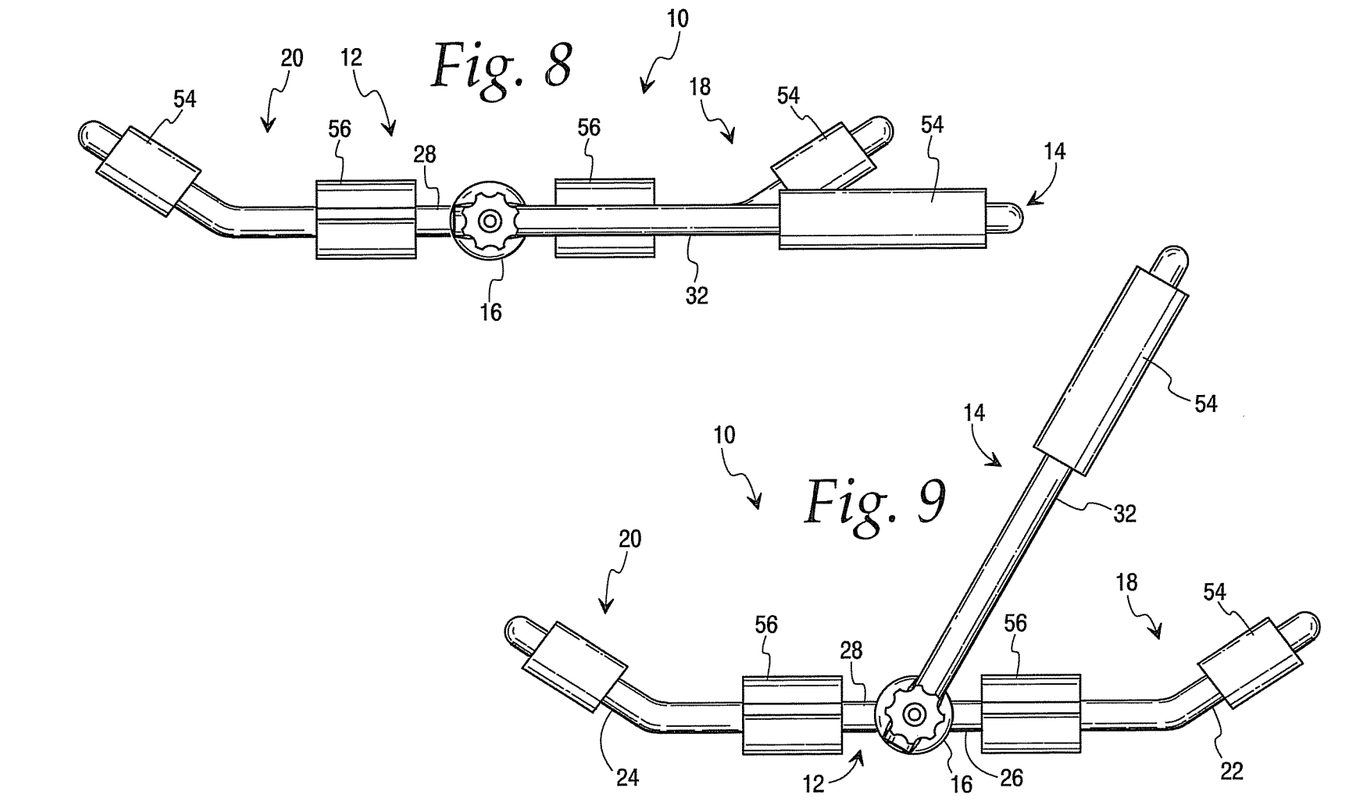
FIG. 8 is an elevational view of one side of the watercraft shown in FIG. 1 with a center support bracket pivoted to about a 0° position relative to the base member.
FIG. 9 is an elevational view of one side of the watercraft shown in FIG. 1 with a center support bracket pivoted to about a 45° position with respect to the base member.

Referring now to the figures, and specifically to FIG. 1 which shows one embodiment of a watercraft carrier 10 according to the present disclosure. Carrier 10 can have a base member 12 and a center support bracket 14 that can be pivotally connected to base member 12. In one embodiment, center support bracket 14 can be pivotally connected in a releasably locking manner to base member 12 by a lockable pivotal positioning assembly 16. Lockable pivotal positioning assembly 16 can allow center support bracket 14 to be locked at any number of positions relative to base member 12 such as, for example, at a 0° angle position as shown in FIG. 8, at a 180° angle position shown in FIG. 10, or any alternate positions therebetween.

Center support bracket 14 can be positioned at or near the center of base member 12 so as to define a first arm 18 and second arm 20 which can be the same length or of different lengths. End portions 22, 24 of first and second arms 18, 20, respectively can be angled or bent upwards to create a cradle for contacting a portion of a watercraft.

Base member 12 can have two spaced apart shafts 26, 28 which can be connected to each other at their respective ends. While it is not necessary to have dual shafts 26, 28 the spaced apart shafts 26 and 28 can provide stability by preventing rocking or tipping of the watercraft. The spacing of shafts can depend on competing goals of compactness of the carrier and stability depending on the size of the watercraft. Shafts 26, 28 can be spaced apart from about six inches to about twenty four inches. In the illustrated embodiment, shafts 26, 28 are spaced apart about six inches.

Figure 10:
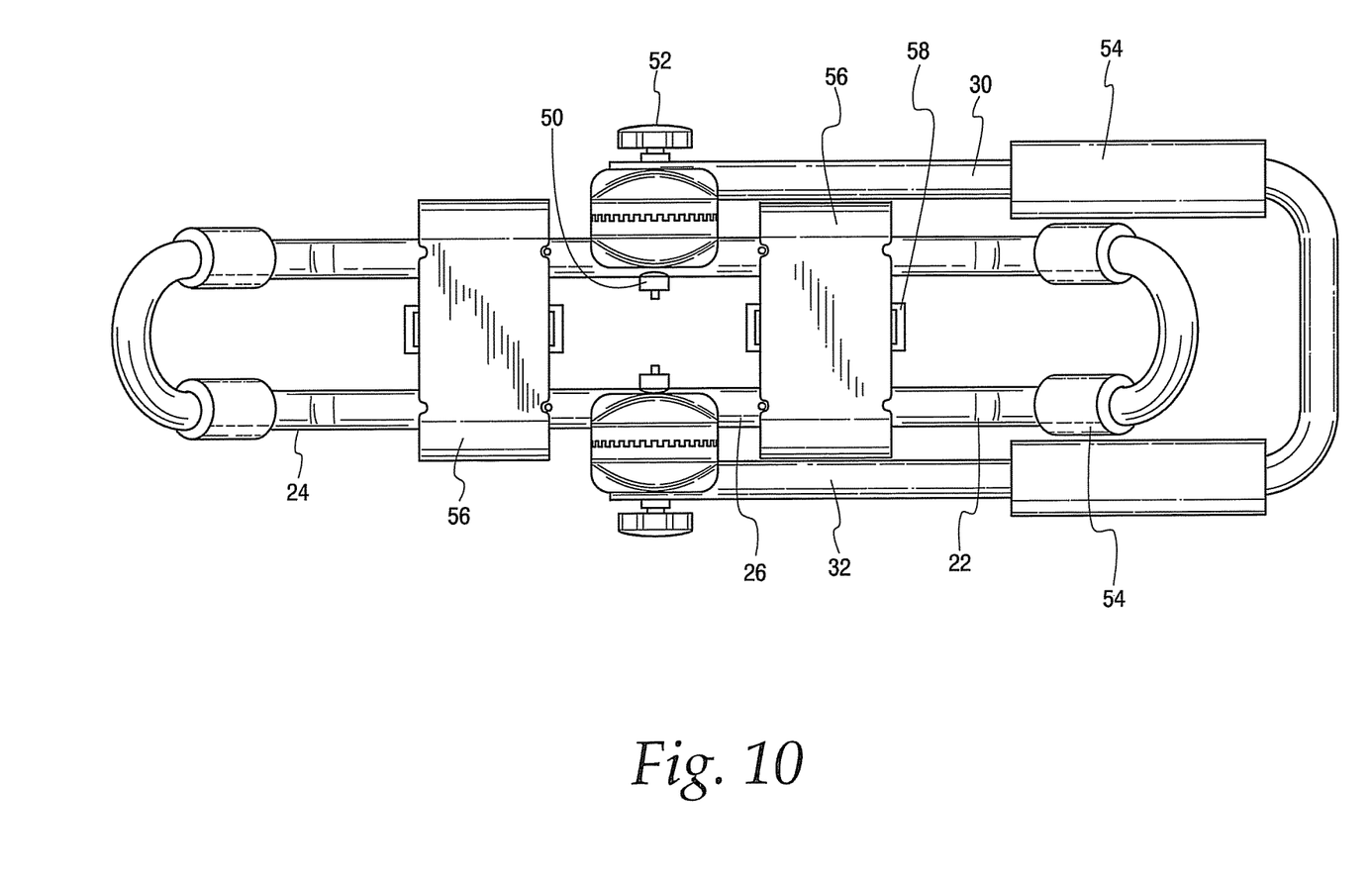
FIG. 10 is top plan view of the watercraft carrier shown in FIG. 1 with a center support bracket pivoted to about a 0° position relative to the base member.

Center support bracket 14 can be a U-shaped member having forward arm 30 connected to shaft 28 via lockable pivotal positioning assembly 16 and a rear arm 32 connected to shaft 26 via lockable pivotal positioning assembly 16. As shown in FIG. 1, center support bracket 14 can have a length greater than either of first or second arm 18, 20 to provide support to watercraft to be carried and to extend past first and second arms 18, 20 when placed in the 0° or 180° position as shown in FIGS. 8 and 10. Alternatively, the length of the center support bracket 14 can have a shorter length of either the first or second arms 18, 20 without departing from the novel scope of the subject invention. In one embodiment, center support bracket 14 can have a length of from about 18 inches to about 42 inches and the first and second arm 18, 20 can have a length from the center of base member 14 of from about 12 inches to about 24 inches. End portions 22, 24 can have a length of from about 6 inches to about 12 inches.

Figure 11:
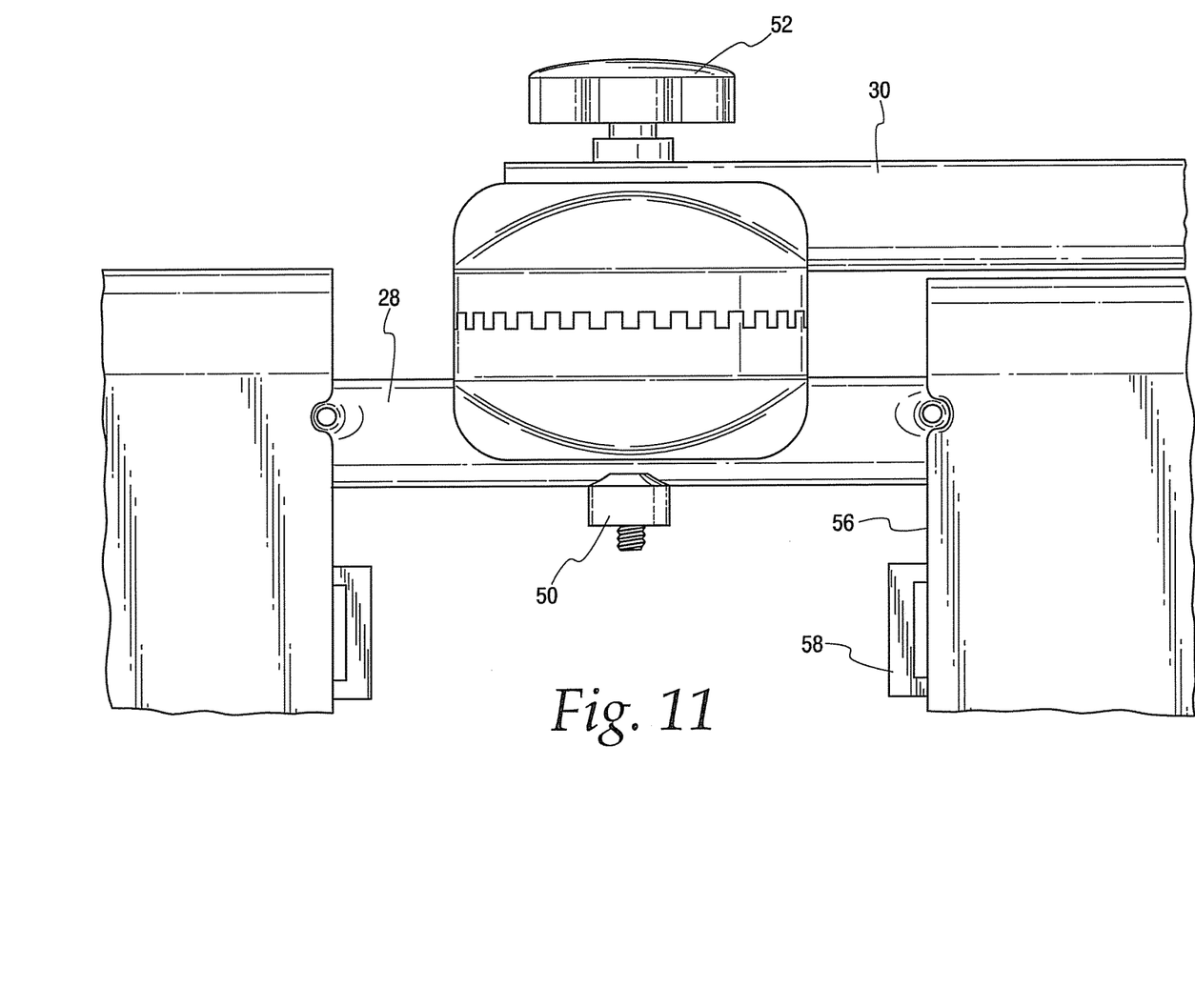
FIG. 11 is top plan detail view of one embodiment of a lockable pivotal positioning assembly between the center support bracket and the base of the watercraft shown in FIG. 1.
Figure 12:
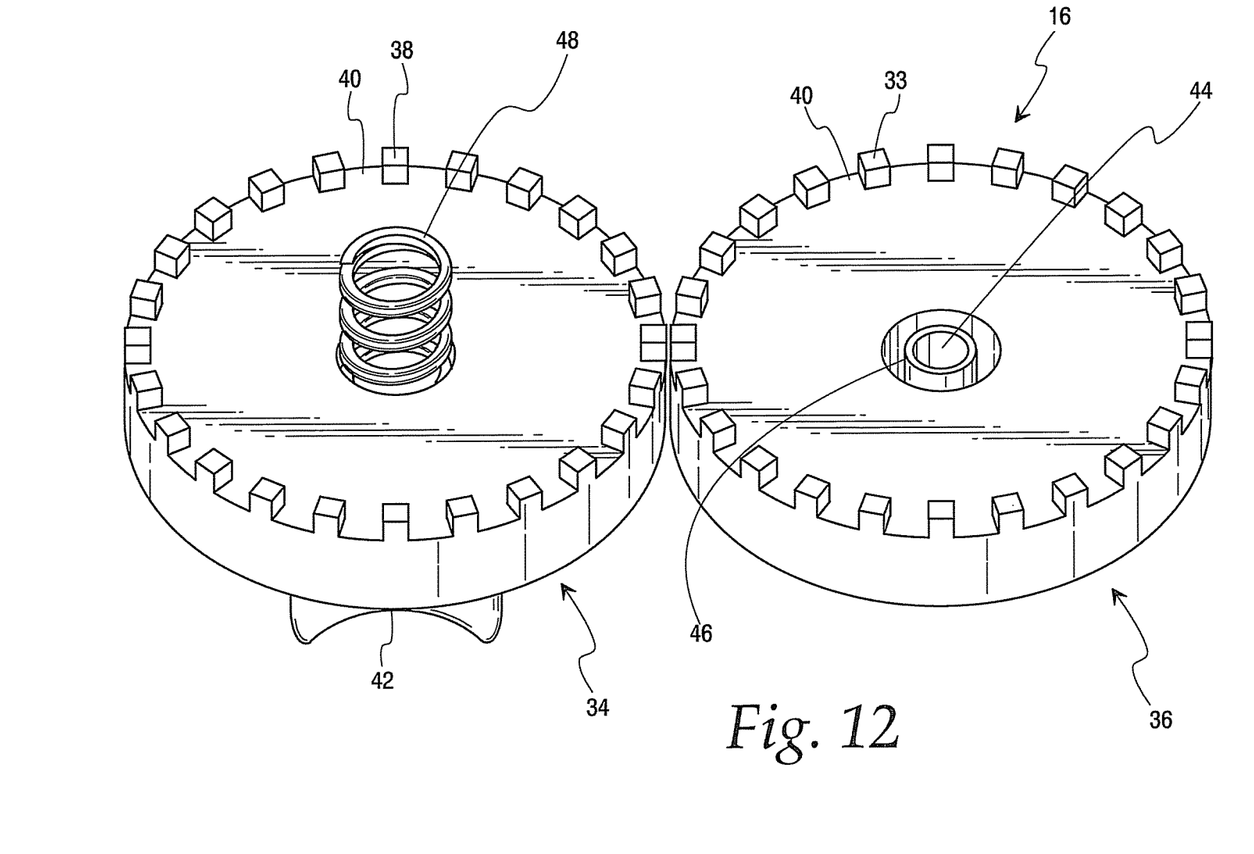
FIG. 12 is a perspective view of the lockable pivotal positioning assembly shown in FIG. 11 disassembled and showing one embodiment of interlocking hubs and spring.

One embodiment of lockable pivotal positioning assembly 16 is shown in FIGS. 11 and 12. Pivotal positioning member 16 can have interlocking hubs 34, 36 with interconnecting teeth. Hubs 34, 36 can be identical to save on tooling costs. One of the hubs 34, 36 can be attached to the forward or rear arm 30, 32 and the other one of the hubs 34, 36 can be attached to the respective shaft 26, 28 at its center. Each of the hubs 34, 36 can include a set of gear teeth 38 and gear grooves 40. Gear teeth 38 and gear grooves 40 of the hubs 34, 36 can interconnect with each other. On the side of each hub 34, 36 opposite the side having the gear teeth 38 and gear grooves 40 can be a channel 42 for accepting the arm 30, 32 or shaft 26, 28.

Each advance of a gear tooth 38 into an adjacent gear groove 40 represents an incremental pivot of center support bracket 14 relative to base member 12. Hubs 34, 36 can each have the same number of gear teeth 38 and gear grooves 40 to provide the desired pivotal increments. In the embodiment shown in FIGS. 11 and 12, gear halves 34, 36 can have twenty eight gear teeth 30 and twenty eight gear grooves 40 to permit approximately a 13° incremental pivot of the center support bracket 14 relative to the base member 12. In other words, center bracket 14 can be incrementally pivoted and locked in seven positions from the 90° position shown in FIGS. 1-7 to the 0° position shown in FIG. 8. Although not shown in FIGS. 11 and 12, it will be further understood by those persons of ordinary skill in the art that hubs 34, 36 can be sized or shaped differently, or have a different number of gear teeth 38 and gear grooves 40 so as to provide for further discrete positioning of the center bracket 14, relative the base member 12.

Hubs 34, 36 can have a center hole 44 to permit passage of a screw, bolt or other fastener to fasten the two hubs 34, 36 together and lock center bracket 14 to base member 12. Hubs 34, 36 can also include a biasing member to urge the halves 34, 36 apart. In the embodiment shown in FIGS. 11 and 12 an annular channel 46 is provided about center hole 44 to receive a compression spring 48.

Assembly and operation will be made with respect to forward arm 30 connected to shaft 28 but is understood the same applies for rear arm 32 and shaft 26. Shaft 28 can have locking sleeve 50 attached in an opening at the center of shaft 28. Knob 52 can have a threaded screw extending therefrom which is threaded through an opening in the forward arm 30 and passed through mated hubs 34, 36. The end of the screw can then be placed in the opening of the locking sleeve 50 and knob 52 can be turned to connect arm 30 to shaft 28 against the biasing force of spring 48. In order to pivot center bracket 14, knob 52 is turned so as to loosen the tightening force of the screw. As the screw of knob 52 is loosened, spring 48 biases hubs 34, 36 apart until the gear teeth 38 of one half 34 are disengaged from the respective gear grooves 40 of the other hub 36. Center bracket 14 can then be pivoted to the desired position. Tightening of knob 52 brings the hubs 34, 36 together until gear teeth 38 and gear grooves 40 mate. It is understood that some adjustment may be necessary to align gear teeth 38 and gear grooves 40 in mating relation.

While carrier 10 shown in the drawings has shafts 26, 28 and arms 30, 32 that have a circular cross-sectional shape, it is not necessary. The cross-sectional shape of the shafts 26, 28 and arms 30, 32 can be variously shaped. In addition, base member 12 and center bracket 14 can be made from a variety of materials that have provided the desired structural support, such as for example, plastics or metals. The base member 12 and center bracket 14 shown in the drawings is made from steel tubing and hubs 34, 36 can be made of molded plastic.

With center support bracket 14 in the 90° position, carrier 10 can carry two small water craft such as kayaks on either side of center bracket 14. Movable tubular cushions 54 of various size can be provided on shafts 26, 28 and arms 30, 32 to prevent direct contact with shafts 26, 28 and arms 30, 32. Center attachment members 56 connected to the base member 12 can be provided and can include connection points for attaching carrier 10 to an automobile roof racks or truck beds. Center attachment members 56 can also include slots 58 for connecting straps. Straps can be connected to slots 58, to center support bracket 14 and to base member to restrain a watercraft. With center bracket 14 in the 0° or the 180° position, carrier 10 can carry a larger watercraft. Center bracket 14 can be pivoted at incremental positions between the 0° or the 180° position and the 90° position to enable receipt of a multitude of watercraft sizes as desired.

The present disclosure includes that which is contained in the appended claims, as well as that of the forgoing description. Although, this invention has been described in its preferred form with a certain degree of particularity, it is understood that the present disclosure of the preferred form has been made only by way of example, and that numerous changes in the details of the elements, compositions and the combination of individual ingredients may be resorted to without departing from the novel spirit or scope of the invention. Indeed, the true measure of the scope of the present disclosure is defined by the appended claims including the full range of equivalents given to each element of each claim.

What is claimed is:

1. A watercraft carrier for mounting on an automotive vehicle roof or flatbed comprising:
   a base member having opposing ends angled upward away from the vehicle roof or flatbed when the carrier is mounted thereto to provide the base member with a cradle shaped configuration, the base member having a first side facing the vehicle roof or flatbed and a second side opposite the first side, the base member having a first shaft and a second shaft between the opposing ends, the first and second shafts being substantially parallel to one another;
   an outwardly extending center support bracket pivotally mounted to a central region of the base member, the support bracket having a u-shaped member having a forward arm and a rear arm and being lockable in a plurality of positions selectable by a user, said positions being disposed on the second side of the base member so that the watercraft may be supported on the second side of the base member and the center support bracket, with the base member being located between the watercraft and the vehicle;
   the forward arm of the support bracket being connected to the first shaft of the base member via a first pivotal assembly and the rear arm of the support bracket being connected to the second shaft of the base member via a second pivotal assembly, the first and second pivotal assemblies pivotally connecting the center support bracket to the base member in a releaseably locking manner and being comprised of interlocking hubs having interlocking gear teeth and gear groves and a co-axially aligned centrally located aperture, the first and second pivotal assemblies having a fastener extending through the aperture.

2. The watercraft carrier of claim 1 wherein the interlocking hubs of the first and second pivotal assemblies have a second side opposite the first side, the second side having a channel adapted for receiving an arm of the center support bracket or a shaft of the base member.

3. The watercraft carrier of claim 1 wherein one of the interlocking hubs of the first pivotal assembly is affixed to the forward arm of the center support bracket, and a second different interlocking hub of the first pivotal assembly is affixed to the first shaft of the base member.

4. The watercraft carrier of claim 1 wherein one of the interlocking hubs of the second pivotal assembly is affixed to the rear arm of the center support bracket, and a second different interlocking hub of the second pivotal assembly is affixed to the second shaft of the base member.

5. The watercraft carrier of claim 1 wherein the first and second pivotal assemblies have a biasing member positioned between the interlocking hubs.

6. The watercraft carrier of claim 1 wherein the first and second pivotal assemblies have a knob affixed to one end of the fastener and a locking sleeve affixed to a second end of the fastener opposite the knob, the fastener extending through an arm of the center support bracket, a shaft of the base member, and the interlocking hubs.

7. The watercraft carrier of claim 1 wherein the base member has at least one attachment member, the at least one attachment member extending substantially perpendicular between the first and second shafts.

8. The watercraft carrier of claim 1 wherein the center support bracket features at least one cushion.

9. A watercraft carrier for mounting on an automotive vehicle roof or flatbed comprising:
   a base member having opposing ends angled upward away from the vehicle roof or flatbed when the carrier is mounted thereto and first and second shafts spaced apart and extending substantially parallel to one another between the opposing ends, the base member having a cradle shaped configuration with a first side facing the vehicle roof or flatbed and a second side opposite the first side;
   an outwardly extending u-shaped center support bracket having a forward arm and a rear arm, the support bracket being pivotally mounted to a central region of the base member, the support bracket being lockable in plurality of positions selectable by a user, said positions being disposed on the second side of the base member so that the watercraft may be supported on the second side of the base member and the center support bracket, with the base member being located between the watercraft and the vehicle roof or flatbed;
   first and second pivotal assemblies pivotally connecting the center support bracket to the base member, the first and second pivotal assemblies having interlocking hubs having interlocking gear teeth and gear groves and co-axially aligned centrally located apertures, the first and second pivotal assemblies having a fastener extending through the apertures and a knob affixed to one end of the fastener, the interlocking hubs of the first and second pivotal assemblies being releasably secured to one another.

10. The watercraft carrier of claim 9 wherein one of the interlocking hubs of the first pivotal assembly is affixed to the forward arm of the center support bracket and a second different interlocking hub of the first pivotal assembly is affixed to the first shaft of the base member.

11. The watercraft carrier of claim 9 wherein one of the interlocking hubs of the second pivotal assembly is affixed to the rear arm of the center support bracket and a second different interlocking hub of the second pivotal assembly is affixed to the second shaft of the base member.

12. The watercraft carrier of claim 9 wherein the interlocking hubs of the first and second pivotal assemblies have a channel adapted for receiving an arm of the center support bracket or a shaft of the base member.

13. The watercraft carrier of claim 9 wherein the first and second pivotal assemblies have a biasing member positioned between the interlocking hubs.

14. The watercraft carrier of claim 9 wherein the first and second pivotal assemblies have a sleeve affixed to a second end of the fastener opposite the knob, the fastener extending through an arm of the center support bracket, a shaft of the base member, and the interlocking hubs.

15. The watercraft carrier of claim 9 wherein the base member has at least one attachment member, the at least one attachment member extending substantially perpendicular between the first and second shafts.

16. The watercraft carrier of claim 9 wherein the center support bracket features at least one cushion along the front or rear arms.

* * * * *